(12) United States Patent
Nishijima et al.

(10) Patent No.: US 6,596,909 B2
(45) Date of Patent: Jul. 22, 2003

(54) ADSORPTION OF ALDEHYDE WITH ADSORBENT CONTAINING ZEOLITE

(75) Inventors: Tuyoshi Nishijima, Hiroshima-ken (JP); Osamu Takayama, Hiroshima-ken (JP)

(73) Assignee: Mazda Motor Corporation, Hiroshima-ken (JP)

( * ) Notice: Subject to any disclaimer, the term of this patent is extended or adjusted under 35 U.S.C. 154(b) by 0 days.

(21) Appl. No.: 09/769,370

(22) Filed: Jan. 26, 2001

(65) Prior Publication Data

US 2001/0012820 A1 Aug. 9, 2001

(30) Foreign Application Priority Data

Jan. 31, 2000 (JP) .......................... 2000-022781
Aug. 16, 2000 (JP) .......................... 2000-246769

(51) Int. Cl.$^7$ .......................... C07C 27/34; C07C 27/18; B01J 21/00; C01B 33/36; B01D 53/04
(52) U.S. Cl. .......................... 568/917; 568/952; 568/878; 568/436; 568/433; 95/96; 502/74; 423/700; 423/704
(58) Field of Search .......................... 95/96; 502/74; 423/700, 704; 568/436, 433, 917, 878, 952

(56) References Cited

U.S. PATENT DOCUMENTS 3,469,959 A * 9/1969 Stein et al. .................. 51/298
4,534,775 A   8/1985 Frazier .......................... 55/74
5,833,739 A   11/1998 Klatte et al. .................. 95/136

FOREIGN PATENT DOCUMENTS

| EP | 0 876 994 | 11/1998 |
| EP | 0 987 030 | 3/2000 |
| JP | 5-16299 | 3/1993 |

OTHER PUBLICATIONS

Geodakyan et al, Zh.Fiz.Khim.,41(4), 904–7 (1967).*
Marme et al; Proc.–Pol.–Ger. Zeolite Colloq., 2nd, 243–52 (1995).*
Patent Abstracts of Japan Publication No. 09–313828, "Filter" Publication Date: Dec. 9, 1997, Inventor: Shiba Yasuo.
European Search Report, Application Ser. No. 01102252.2–2104 Dated: Mar. 8, 2002.

* cited by examiner

Primary Examiner—Johann Richter
Assistant Examiner—Sikarl A. Witherspoon
(74) Attorney, Agent, or Firm—Nixon Peabody LLP; Donald R. Studebaker

(57) ABSTRACT

The present invention provides the adsorbent which adsorbs the aldehyde efficiently for a long period. The present invention also includes an adsorption device, an article and a method using the same. The adsorbent of the invention comprises a zeolite, wherein the zeolite has $NH_4^+$ as ionic species; a crystal structure of ZSM-5 or ferrierite; a molar ratio of $SiO_2/Al_2O_3$ from 30 to 190; and the zeolite retains a quarternary ammonium salt which adsorbs the aldehyde with the reaction of the aldehyde. In the case of a formaldehyde, the zeolite has $NH_4^+$ as ionic species.

7 Claims, 15 Drawing Sheets

TETRA-n-PROPYLAMMONIUM BROMIDE → TRIPROPYLAMINE + PROPYLBROMIDE

TRIPROPYLAMINE + ACETALDEHYDE → PROPYLAMINOALCOHOL

QUARTERNARY AMMONIUM
ION
ACETALDEHYDE
ALKYLAMINOALCOHOL

NH4 ZEOLITE  +  FORMALDEHYDE

H ZEOLITE  +  α-AMINOMETHYLALCOHOL (SOLID)

- —◇— ADSORBENT OF THE INVENTION : NH4 ZEOLITE ZSM-5 WITH SiO2/Al2O3 OF 70 AFTER RETAINING QUARTERNARY AMMONIUM SALT +PVA2.5%

- —□— ACTIVATED CHARCOAL +PVA2.5%

- —△— ZEOLITE : H ZEOLITE ZSM-5 WITH SiO2/Al2O3 OF 80 +PVA2.5%

ADSORPTION OF ALDEHYDE WITH ADSORBENT CONTAINING ZEOLITE

FIELD OF THE INVENTION

The present invention relates to an adsorbent which removes aldehyde as a component to be adsorbed for a long period, an adsorption device, other articles and an adsorbing method using the same. The invention can be applied for adsorbing the aldehyde efficiently, especially the aldehyde existing in a room of an automobile, a house or a residence.

BACKGROUND OF THE INVENTION

As a method of removing components to be adsorbed in a gas, a sprinkler cleaning device is used at a large plant such as a sewage treatment plant and a trash burning plant in urban areas by using cleaning water which is prepared by dissolving an agent reactive with the component to be adsorbed. However, as a deodorizing method in a closed and narrow space such as a lavatory, a room in a house or an automobile, a conventional physical adsorbent such as an activated charcoal is used because it is impossible to install a large-scale sprinkler cleaning system therein.

On the other hand, it is confirmed that aldehydes such as formaldehyde, acetaldehyde and benzaldehyde and the like come from decomposed gases of fuels and oils, smoke of cigarettes, an adhesive used for laminating interior boards with interior members and heat insulating foamed resins, and remain in, for example, a room of an automobile. The aldehydes also come from heat insulating member, plywood, smoke of cigarettes, an adhesive and the like and remain in a house or a residence. Since these aldehydes are harmful, these components should be removed from the gas containing the aldehydes. As a method of removing the components to be adsorbed such as the aldehydes by adsorption, for example, an air cleaner which is filled with an activated charcoal adsorbent is known. However, the present inventors have found that little aldehyde was removed by the adsorbent such as an activated charcoal, although the components to be highly adsorbed can be removed to some extent. For example, since a physical adsorbent such as an activated charcoal removes a component to be adsorbed by adsorption-capturing in adsorption site, the physical adsorbent cannot adsorb the component any more when the adsorption site is once filled with the component. The physical adsorbent also adsorbs moisture(water) contained in a gas to be treated, thus does not serves as an adsorbent when the adsorption site is filled with the moisture. Therefore, the physical adsorbent tends to lose the adsorption performance in a short time due to the adsorption of the moisture which a gas contains in a considerable amount in a house or an automobile. In addition, the disadvantage of the physical adsorbent such as an activated charcoal is that the activated charcoal releases an adsorbate which the activated charcoal once adsorbed when the activated charcoal is used at the high temperature.

Japanese Examined Patent Publication No. 5-16299 discloses a crystalline aluminosilicate as a deodorant for an automobile and that H zeolite is preferably used as the aluminosilicate. H zeolite exhibits the desired performance as shown in examples of that specification when H zeolite is subjected to deodorizing the components to be adsorbed which is contained in a closed space like a sealed vessel. However, in a open space containing the components to be adsorbed, the adsorption ability is saturated soon due to the large amount of the components to be adsorbed, thus the deodorization effect is lost in a very short period such as several ten minutes.

SUMMARY OF THE INVENTION

The present invention have been accomplished to overcome the above problems. It is an object of the invention to develop and provide an adsorbent which adsorbs the aldehydes efficiently for a long period. It is another object to provide an adsorption device and other articles using the same. It is further another object to provide a method for adsorbing the aldehydes using the same.

According to the invention, the adsorbent contains a zeolite, wherein a component to be adsorbed is aldehyde; the zeolite contains $NH_4^+$ as ionic species; the zeolite has a crystal structure of ZSM-5 or ferrierite; the zeolite has the molar ratio of $SiO_2/Al_2O_3$ from 30 to 190; and the zeolite retains a quarternary ammonium salt which adsorbs the aldehyde with the reaction of the aldehyde.

The adsorption device, other articles and an adsorbing method of the invention is characterized in using the above adsorbent.

DETAILED DESCRIPTION OF THE PREFERRED EMBODIMENT

The adsorbent of the invention comprises a zeolite, wherein the zeolite has $NH_4^+$ as ionic species; the zeolite has a crystal structure of ZSM-5 or ferrierite; the zeolite has a molar ration of $SiO_2/Al_2O_3$ of 30 to 190; and the zeolite retains a quaternary ammonium salt which adsorbs the aldehyde with the reaction of the aldehyde. The adsorbent of the invention is described in detail below.

I. Zeolite (a) A Component to be Adsorbed

The component to be adsorbed in the invention includes, for example, aldehydes such as formaldehyde, acetaldehyde and benzaldehyde. Especially when the component is acetaldehyde, the zeolite must retain a quarternary ammonium salt to adsorb the acetaldehyde efficiently. The quarternary ammonium salt is retained in an acid-site, especially an acid site existing at the surface of the zeolite crystal. When the acetaldehyde was captured in the pore of the zeolite, the acetaldehyde reacts with a neighboring quarternary ammonium salt to generate an alkylaminoalcohol which does not smell of aldehyde.

In the invention, the term of "a quarternary ammonium salt compound is retained in the zeolite" means both that "a quarternary ammonium salt is retained in the zeolite as a salt" and that "a quarternary ammonium ion is retained in the zeolite as an ion". Therefore, "quarternary ammonium salt" denotes the general term of "quarternary ammonium salt compound" and "quarternary ammonium ion".

(b) Adsorption Mechanism

Figure 1:
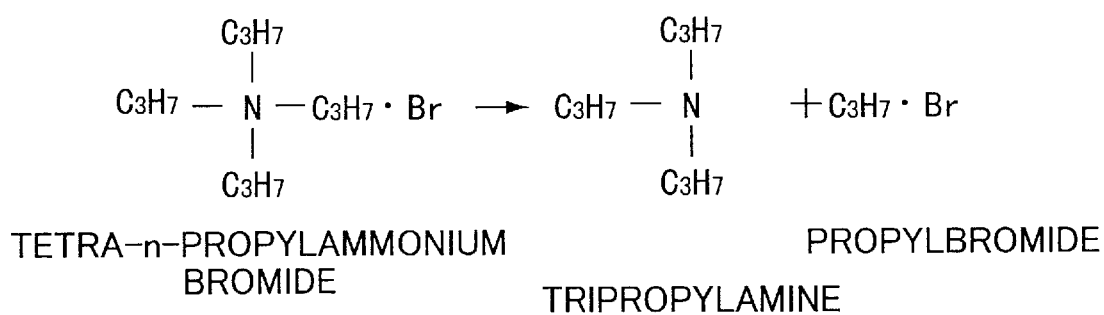
FIG. 1 illustrates an example of the reaction of acetaldehyde with a quarternary ammonium salt.
Figure 1:
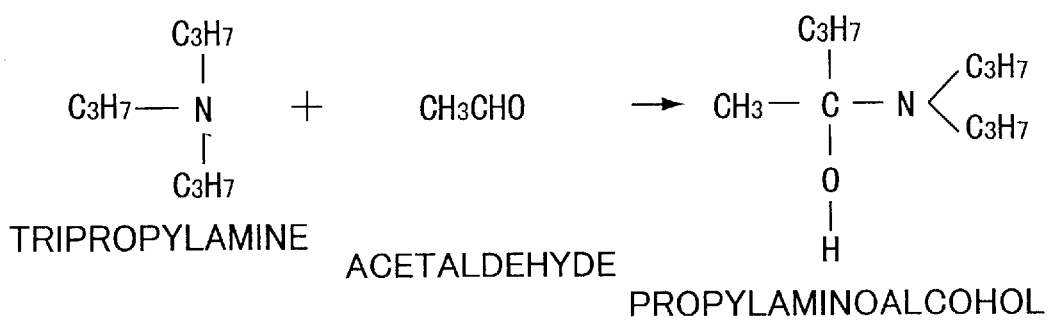
Figure 2:
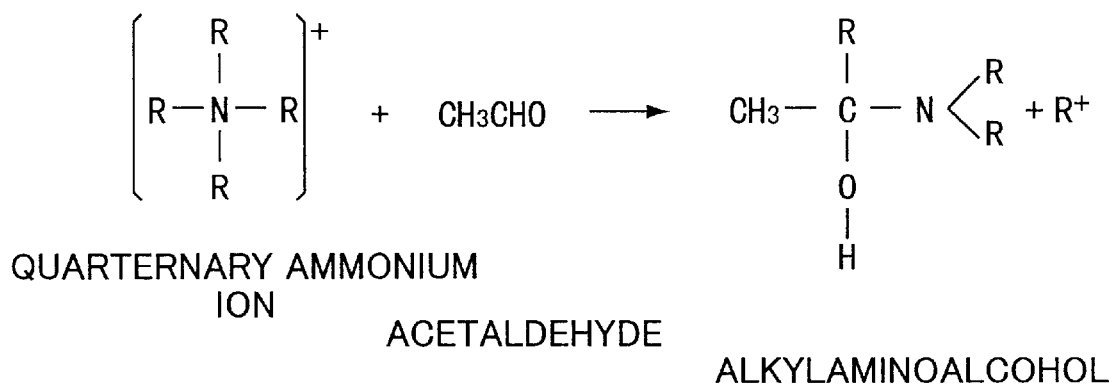
FIG. 2 illustrates an example of the reaction of acetaldehyde with a quarternary ammonium ion retained in a zeolite.

FIG. 1 shows an example of tetra-n-propyl ammonium bromide being retained in the zeolite as a quarternary ammonium salt compound. The tetra-n-propyl ammonium bromide separates into tri-propylamine and propyl bromide. The tri-propyl amine reacts with the acetaldehyde to produce propylaminoalcohol, which is captured in the zeolite. FIG. 2 shows the quarternary alkylammonium ion being retained in the zeolite. In this case, the quarternary alkylammonium ion reacts with acetaldehyde to produce alkylaminoalcohol.

(c) Ionic Species

The zeolite contains $NH_4^+$ as ionic species (hereinafter referred as $NH_4$ zeolite). When the zeolite contains other ionic species than $NH_4^+$, for example $Na^+$, the performance of adsorbing the aldehyde becomes low. This is because the zeolite does not retain the quarternary ammonium salt in an amount enough to react with the acetaldehyde in the case of other ionic species than $NH_4^+$. It becomes difficult to retain the quarternary ammonium salt in the zeolite depending on the difference of the acid-site of the zeolite, resulting in the poor adsorption of the aldehyde. However, the acid-site of the $NH_4$ zeolite contributes to retain the quarternary ammonium salt which reacts with the aldehyde and tends to enhance the adsorption of the aldehyde. Therefore, $NH_4$ zeolite is used in the invention.

The acid-site usually exists both inside the crystal (inside the pore of the crystal) and at the surface of the crystal. The quarternary ammonium salt tends to be retained at the acid-site at the surface of the zeolite crystal because the quarternary ammonium salt has too large molecular size to enter inside the zeolite crystal. Especially, it is assumed that the zeolite ZSM-5 has many acid-sites at the surface of the crystal to thereby ensure the quarternary ammonium salt in an amount enough to react with the aldehyde, thus the performance of the zeolite ZSM-5 to adsorb the aldehyde is improved.

The above described adsorption mechanism is explained based on post-retaining the quarternary ammonium salt into the zeolite. The quarternary ammonium salt which is used as a mineralizer (crystallizing adjustor) at the synthesis of the zeolite may be left in the zeolite without being removed to exhibit the same performance and the same mechanism as described above. However, when the ionic species of the zeolite is exchanged from $NH_4^+$ to other ionic species, the $NH_4^+$ derived from a mineralizer must be removed completely by heating and then other ionic species must be introduced into the zeolite. After introducing other ionic species, the quarternary ammonium salt must be retained in the zeolite again. The disadvantage of the above process is that the quarternary ammonium salt is not retained in the zeolite which has other ionic species than $NH_4^+$ in an amount enough to adsorb the aldehyde sufficiently as described above.

(d) Quarternary Ammonium Salt

A quarternary alkylammomium salt is preferably used, more preferably, a tetraalkylammonium salt is used as a quarternary ammonium salt because it is easily available as a commercial product. Examples of a quarternary alkylammonium salt are, tetra-n-propylammonium bromide, tetramethylammonium bromide, tetraethylammonium bromide and tetra-n-butylammonium bromide. The quarternary ammonium salt may be used individually or in combination of at least two. The tetra-n-propylammonium bromide and the tetraethylammonium bromide are most preferable because of removing the acetaldehyde efficiently for a longer period. The process of retaining the quarternary ammonium salt in the zeolite, without limitation, includes a process where the quarternary ammonium salt which is used as a mineralizer (crystallizing adjustor) at the synthesis of the zeolite is left in the zeolite by adjusting a heat treatment condition to leave the mineralizer therein and a process where the zeolite is immersed with the aqueous solution of the quarternary ammonium salt. The quarternary ammonium salt is retained in the zeolite preferably in an amount of at least 0.5 mass % with respect to the zeolite.

(e) $SiO_2/Al_2O_3$ Molar Ratio

It is confirmed that the molar ratio of $SiO_2/Al_2O_3$ of $NH_4$ zeolite affects the adsorption of the acetaldehyde. As mentioned above, the quarternary ammonium salt is retained in the zeolite, especially at the acid-site existing at the surface of the zeolite crystal. The total amount of the quarternary ammonium salt retained in the zeolite is affected by both total number of the acid-sites and the intensity of each acid-site which are respectively related to the molar ratio of $SiO_2/Al_2O_3$. Therefore, the molar ratio of $SiO_2/Al_2O_3$ affect the adsorption of the aldehyde.

The total intensity of the acid-sites all over the zeolite is almost constant even if the molar ratio of $SiO_2/Al_2O_3$ has changed, thus the intensity of each acid-site is determined by the number of the acid-sites all over the zeolite. The number of the acid-sites is inversely proportional to the molar ratio of $SiO_2/Al_2O_3$ and is proportional to the number of Al atoms contained in the zeolite. Thus, the number of the acid-sites increases as the molar ratio of $SiO_2/Al_2O_3$ decreases and the number of the acid-sites decreases as the molar ratio increase. The intensity of each acid-site becomes weaker as the total number of the acid-sites increase, and becomes stronger as the total number of the acid-sites decrease.

When the molar ratio of $SiO_2/Al_2O_3$ is less than 30, the total amount of the quarternary ammonium salt which is retained in the zeolite decreases. This is because the intensity of each acid-site becomes too low regardless of many acid-sites where the quarternary ammonium salt is supposed to be retained. When the molar ratio of $SiO_2/Al_2O_3$ is more than 190, the amount of the quarternary ammonium salt which is retained in the zeolite also decreases because the number of the acid-sites becomes too small regardless of the high intensity of each acid-site. Therefore, the $NH_4$ zeolite ZSM-5 has the preferable molar ratio of $SiO_2/Al_2O_3$ from 30 to 190, more preferably 55 to 90, to exhibit the sufficient adsorption of the acetaldehyde.

(f) Crystal Structure of Zeolite

The acetaldehyde is captured in the pore of the zeolite, and then reacts with a neighboring quarternary ammonium salt. Herein, the molecular size of the acetaldehyde is approximately 3 Å. Therefore, the zeolite has the preferable pore size (the average diameter of the pore at the surface of the zeolite) larger than 3 Å to adsorb the acetaldehyde. From the above view point, the zeolite has preferably the crystal structure of ZSM-5 (pore size: 5.5 Å) or ferrierite (pore size: 4.3 Å/3.4 Å). On the other hand, the pore size which is larger than 6 Å like zeolite β is not preferable because the pore size is too large to capture the acetaldehyde certainly.

(g) Adsorption of a Formaldehyde

Figure 3:
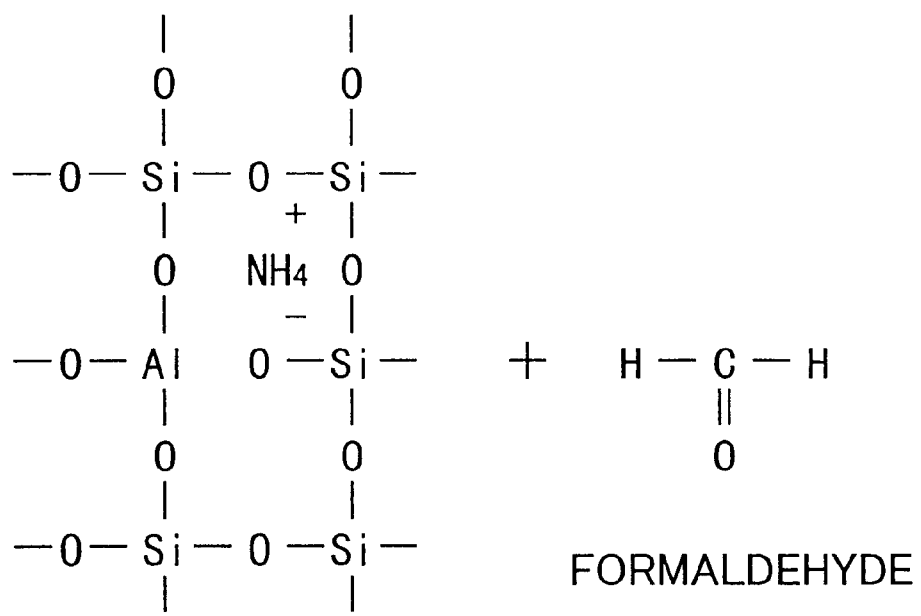
FIG. 3 illustrates an example of the reaction of formaldehyde with $NH_4$ zeolite.
Figure 3:
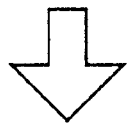
Figure 3:
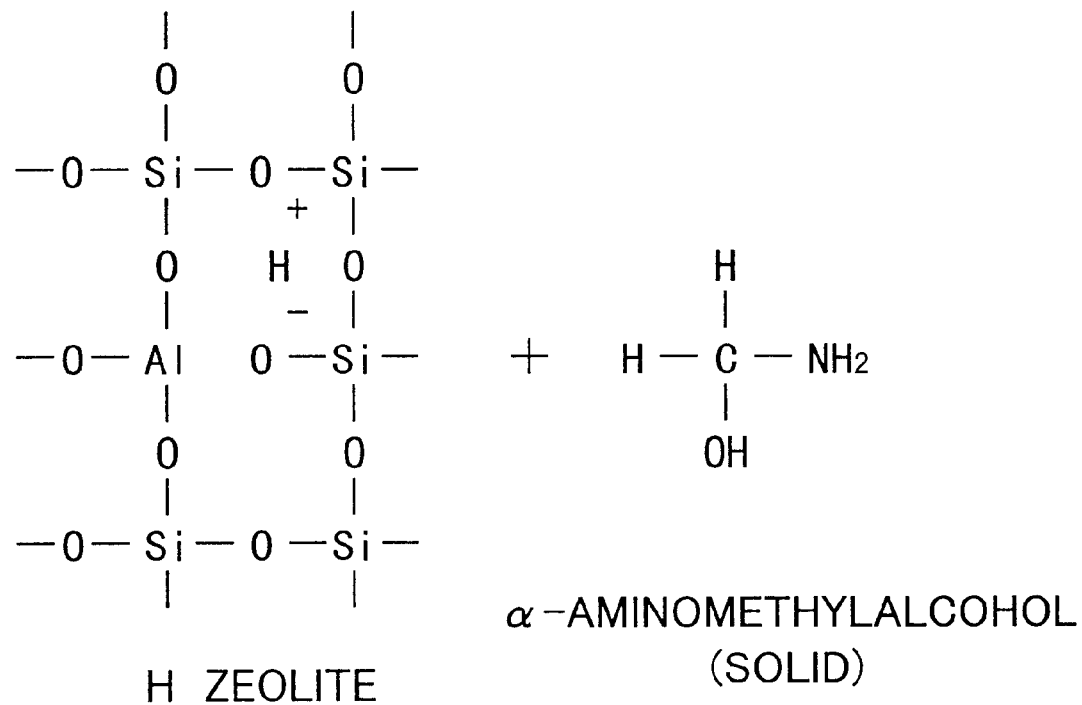

In the case of formaldehyde as a component to be adsorbed, it was confirmed that $NH_4$ zeolite exhibits an excellent adsorption. FIG. 3 shows the mechanism of the adsorption of the formaldehyde with $NH_4$ zeolite. $NH_4^+$ ion contained in the zeolite reacts with the formaldehyde to produce a product which does not smell of aldehyde at the same time that $NH_4$ zeolite changes into H zeolite. Namely, $NH_4^+$ ion contained in $NH_4$ zeolite reacts with the formaldehyde (gas) to form H zeolite and α-aminomethylalcohol (solid), thereby capturing the gaseous formaldehyde in the form of the solid α-aminomethylalcohol. In the case of the zeolite which has other ionic species than $NH_4^+$, it is considered that the zeolite cannot capture the formaldehyde because α-aminomethylalcohol (solid) is not produced by the reaction of the other ionic species than $NH_4^+$ with the formaldehyde.

Since the reaction with the formaldehyde is carried out in a captured state in the pore of the zeolite in the same way of the acetaldehyde as a component to be adsorbed, the zeolite has preferable pore size of at least 2 Å to adsorb the formaldehyde whose molecular size is approximately 2 Å.

Therefore, the $NH_4$ zeolite has preferably the crystal structure of ZSM-5, Y, β, mordenite, or ferrierite to ensure the sufficient adsorption in the case that a component to be adsorbed is the formaldehyde. More preferably, the $NH_4$ zeolite has the crystal structure of ZSM-5 in view of exhibiting the excellent adsorption of the acetaldehyde as well as formaldehyde. And, it is confirmed that the $NH_4$ zeolite ZSM-5 preferably has the molar ratio of $SiO_2/Al_2O_3$ from 30 to 190 to exhibit the excellent adsorption.

(h) Form of Zeolite $NH_4$ zeolite used in the invention is available as a commercial product, and $NH_4$ zeolite may have the form of granule, honeycomb, porous plate or porous block, and preferably have the form of granule for the gas to pass through easily. The process to produce $NH_4$ zeolite in the form of granule includes, without limitations, is a well known process such as extrusion molding and high speed mixing granulation. A well known binder also may be used for the granulation and the preferable added is an aqueous binder such as a polyvinyl alcohol. The binder is preferably added in an amount of at least 1 mass %, more preferably at least 2 mass % to 50 mass %, more preferably 20 mass % with respect to the zeolite. If less than 1 mass % of the binder is used, the granulation becomes difficult. If greater than 50 mass % of the binder is used, the adsorbing performance becomes low.

II. Adsorption Device

The present invention also includes an adsorption device comprising an adsorbing member which is filled with the adsorbent of the invention. The adsorbent of the invention is excellent in adsorbing the aldehyde. If a gas to be treated is allowed to pass through the adsorbing member filled with the adsorbent of the invention, the aldehyde component contained in the gas to be treated is adsorbed and removed efficiently. An example of the adsorbing member is, without limitation, a proper vessel filled with the adsorbent of the invention.

The adsorption device may further comprise a fan which introduce the gas to be treated into the adsorbing member. The fan may be placed at the proper position of the adsorption device, for example in front of or in the rear of the adsorbing member, thus the gas to be treated is smoothly introduced into the adsorbing member. For example, it is also preferable to place the adsorbing member in a proper position in front of or in the rear of the air-conditioner installed in a room or a car, because the fan of the air-conditioner serves as a fan to introduce the gas to be treated into the adsorbing member. It is also effective to control the feed of the gas by the fan in accordance with the concentration of the component to be adsorbed contained in the gas.

The adsorption device with a fan, for example, may be mounted on a ceiling or a rear package tray behind the rear seat in a car for adsorption by circulating the air in the car. The adsorption device may further comprise a filter which removes dust. Preferably, the filter removing dust may be combined with the adsorbing member to obtain one unit of the filter by laminating them, or the filter removing dust may be placed in line with the adsorbing member to adsorb the aldehyde and remove the dust at the same time.

Figure 4:
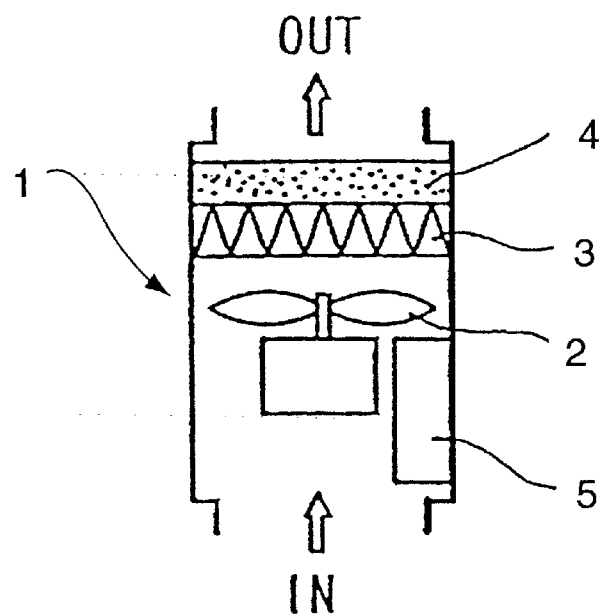
FIG. 4 is a conceptual illustration of a concrete example of the adsorption device of the invention.
Figure 5:
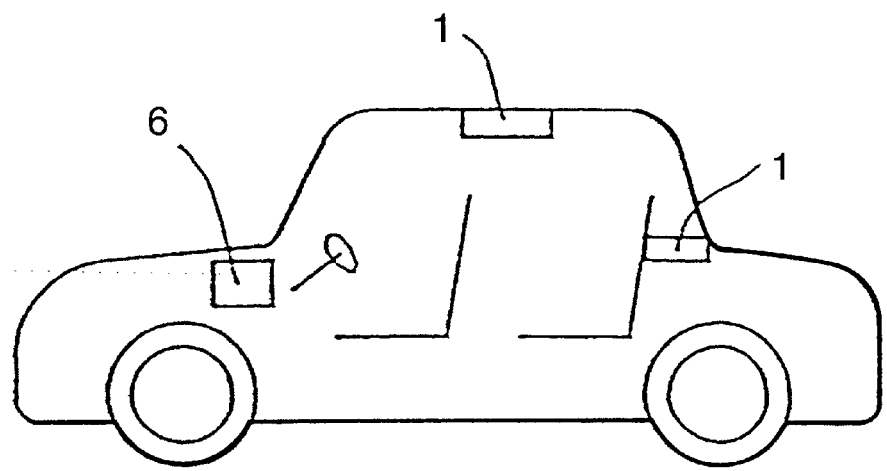
FIG. 5 is an illustration of the arrangement of the adsorption device in an automobile.

FIG. 4 is a conceptual view of an example of the adsorption device for circulating treatment system. The adsorption device 1 includes a fan 2 for feeding a gas to be treated, and also includes a dust removal filter 3 and the adsorbing member 4 on the downstream side of the fan 2 in order to conduct a adsorption and a dust removal treatment of the gas. Optionally, the fan 2 begins to work automatically when the pollution degree of the gas which is detected by a detector 5 comes to the predetermined value. FIG. 5 shows an example of the adsorption device 1 used in an automobile. The adsorption device 1 may be mounted at the proper position, for example, on the ceiling, or the rear package tray behind the rear seat in the car to keep the air clean at any time.

Figure 6:
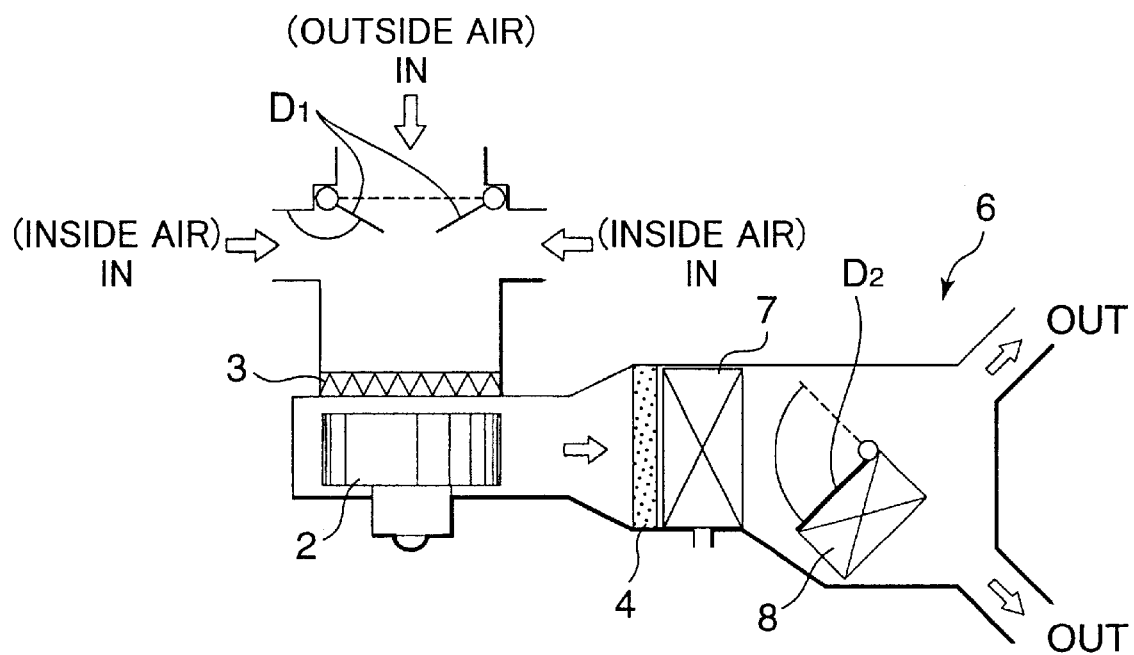
FIG. 6 is an illustration of an air conditioner for an automobile with which the adsorption device of the invention is placed.

FIG. 6 is a conceptual view of the adsorption device of the invention combined with an air-conditioner 6 of the automobile.

An outside air or an inside air is allowed to pass through a dust removal filter 3 and fed toward to the adsorbing member 4 and an evaporator 7 through which the gas is supplied into the car. The air-conditioner 6 further includes a heater 8 and dampers D1 and D2 which control the gas flow. The air-conditioner 6 may be placed in front of the car room as schematically shown in FIG. 5.

The adsorbing member may be attached to the adsorption device detachably. The adsorbing member loses the adsorbing performance gradually as the adsorbent of the invention is consumed by the chemical reaction with the component to be adsorbed. Therefore, after the adsorbent is consumed, it is preferable to exchange the adsorbing member after use with the adsorbing member filled with the new adsorbent of the invention.

A process for producing a filter including the adsorbent of the invention includes, without limitation, a process where the adsorbent is put between support members such as non-woven fabric and antistatic paper, or a process where a support member such as non-woven fabric is dipped into the mixture of the binder and the adsorbent, and then dried directly to retain the adsorbent.

Figure 7A:
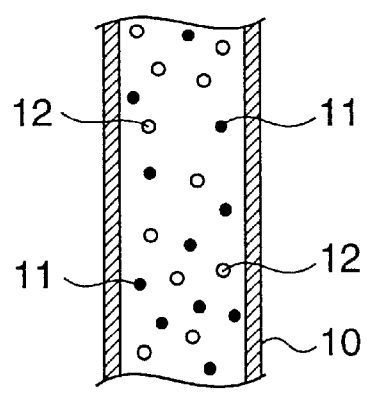
FIG. 7A illustrates an example of the filter (in combination with an activated charcoal) of the invention.
Figure 7B:
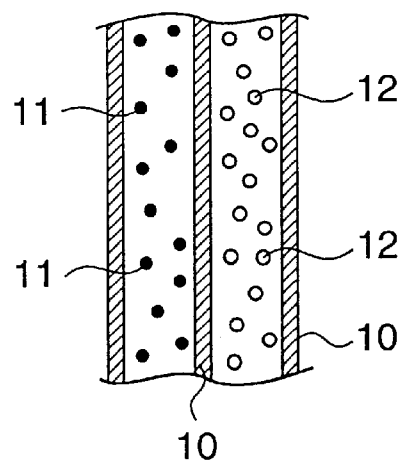
FIG. 7B illustrates a modified example of the filter (in combination with an activated charcoal) of the invention.

In the case of adsorbing the aldehyde from the gas to be treated such as an exhaust gas of a car, a smoke of a cigarette, an exhaust gas of an oil fan heater, it is preferable to use the adsorbent of the invention in combination with the conventional physical adsorbent such as an activated charcoal as shown in FIG. 7A. For example, the mixture of the activated charcoal 11 and the adsorbent 12 of the invention may be placed between the support members 10 such as non-woven fabric and anti static paper as shown in FIG. 7A, or the activated charcoal 11 and the adsorbent 12 may be put between the support members 10, respectively, to form the activated charcoal 11 layer and the adsorbent 12 layer separately as shown in FIG. 7B.

III. Article

The present invention also includes an article which comprises the adsorbent of the invention. The adsorbent of the invention may be used for an article which adsorbs a component to be adsorbed from the surface of the article (contact-adsorption type), in addition to an adsorption device and a filter through which a gas to be adsorbed is subjected to passing for the adsorption treatment (pass-adsorption type).

The article of the invention may further comprises a physical adsorbent and other chemical adsorbents which adsorbs ammonia, hydrogen chloride and hydrogen sulfide efficiently in addition to the adsorbent of the invention. Examples of adsorbents preferable for adsorbing ammonia are an acidic deodorant such as a fumaric acid, a betaine (amphoteric) compound, and a complex formation type deodorant such as anico (a ferrous compound). Examples of adsorbents preferable for adsorbing hydrogen chloride and hydrogen sulfide are a basic deodorant such as a sodium carbonate and an amine compound, a carboxylic acid metal salt, and a betaine (amphoteric) compound. Ammonia, hydrogen chloride, and hydrogen sulfide are components which an activated charcoal releases as well as the aldehyde at the high temperature, even if these components are once adsorbed by the activated charcoal. Therefore, it is preferable to use the above chemical adsorbent together with the activated charcoal in addition to the adsorbent of the invention.

The article of the invention includes, without limitation, a combustion heater, a combustion equipment (except a combustion heater), a building material, wear, baggage, furnishings, and housewares and the like. Example of a combustion heater and a combustion equipment are an oil stove, an oil fan heater, a boiler, a burner, a gas cooking stove and a gas water heater for home use. Examples of a building material are a door, a window, a shutter, a wall paper, interior decoration and a tile. Examples of wear are clothing, a hat, a mask and a footgear. Examples of baggage are a bag and a handbag. Examples of furnishings are a table, a desk, an office furniture, a cabinet, a chest of drawers, a chair, a sofa, a bed, an illuminator, a ventilator, a kitchen equipment. Examples of housewares are decorative goods for deodorant, a smoking pipe, a dust collector (for office use and industrial use as well as domestic use), an ash tray, a vacuum cleaner, an air cleaner, a dehumidifier, a humidifier, a carpet, a mat, a tatami, a curtain, a blind, a wall paper, a shoji, a fusuma, a tent, other decorative goods, an article which is placed in a ventilation system or a ventilation duct in a house, and an article which is placed in a hood above the gas cooking stove. These articles are just examples and not construed to limit the article of the invention. The adsorbent of the invention may be used in combination with an insecticide, a paint, an adhesive, a cement, stone and a clayey material.

(a) Oil Fan Heater

Figure 8:
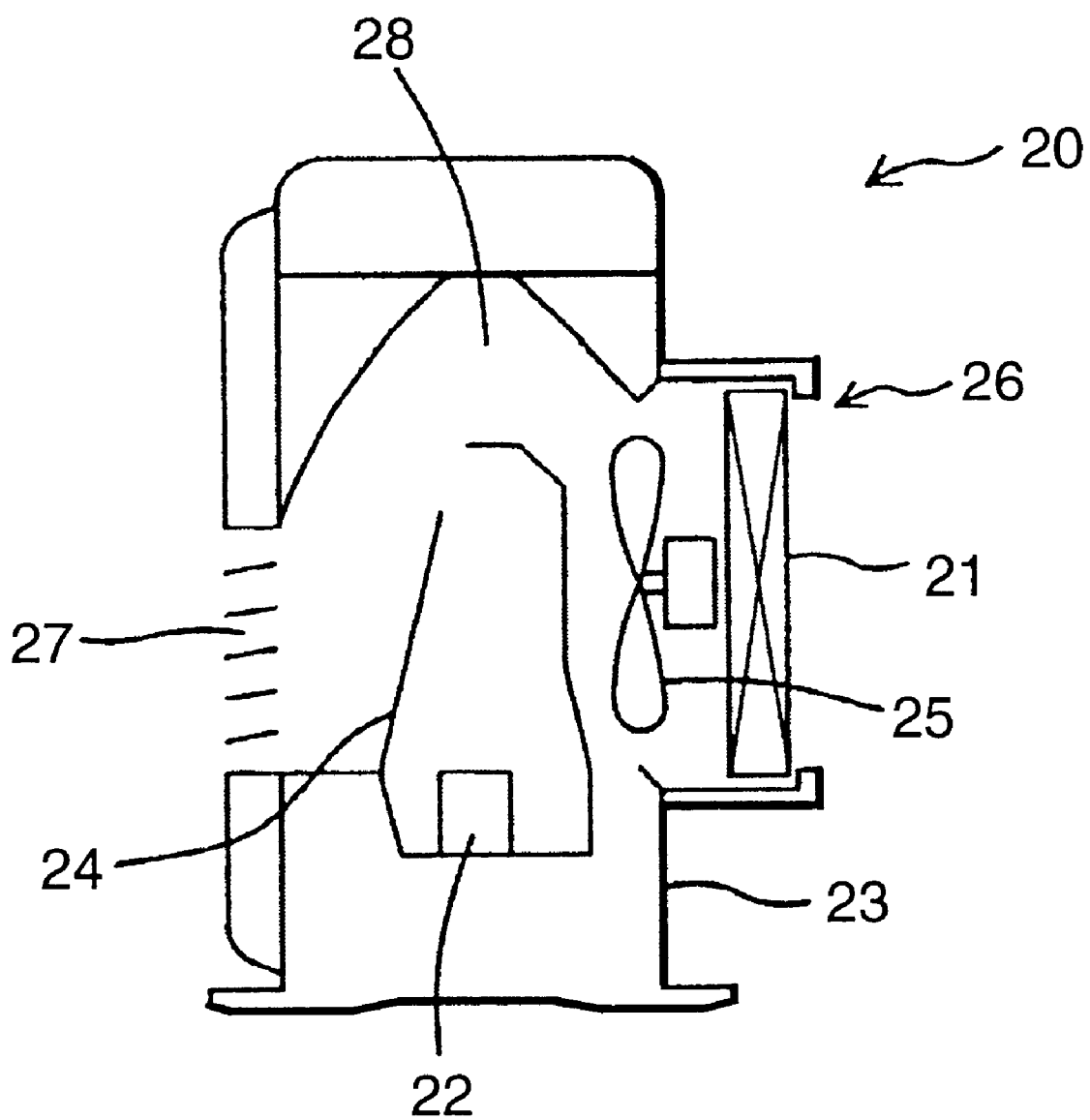
FIG. 8 is a sectional view of the oil fan heater as an example of the article of the invention.

A room air cleaner is described in detail below based on the drawings as an embodiment of the invention. FIG. 8 shows a sectional view of an oil fan heater 20 of a combustion hot-air heating as a preferred example of the article of the invention. The oil fan heater 20 comprises a burner 22 which burns an oil fuel in a combustion chamber 24 placed in the center of a casing 23. The oil fan heater 20 comprises an air intake 26 equipped with a fan 25 at the rear of the casing 23, an air exit 27 in front of the casing 23, an air path 28 communicating with the combustion chamber 24 between the air intake 26 and the air exit 27. A filter 21 which comprises the adsorbent of the invention to clean an air is placed at the rear of the fan 25 in the air intake 26. The air in a room is allowed to pass through the filter 21 from right to left in FIG. 8 to thereby be cleaned. The air is further heated in the combustion chamber 24 while passing through the air path 28 and then a hot air comes out of the air exit 27. In FIG. 8, the filter 21 comprises the physical adsorbent and the other chemical adsorbents as well as the adsorbent of the invention and is placed on the upstream side of the fan 25. The filter 21 may be placed on the downstream side of the fan 25 at the side of the air intake 26 (namely, between the fan 25 and the combustion chamber 24). The adsorbent of the invention and the filter 21 for removing dust may be placed separately. In this case, the adsorbent of the invention can be placed at the proper position in and near the air-path 28.

When the physical adsorbent and the other chemical adsorbents are used in combination with the adsorbent of the invention, the following consideration should be taken. The physical adsorbent tends to release the adsorbed components at the high temperature, and the other chemical adsorbents are affected by heat, thus it is preferable that the adsorbents are placed on the upstream side of the combustion chamber 24, namely at the side of the air intake 26. It is also possible that the filter 21 may only contain the adsorbent of the invention, or the other chemical adsorbents in addition to the adsorbent of the invention.

(b) Cigarette

The article of the invention also includes a cigarette which comprises a filter portion and a combustion portion. The filter portion contains the adsorbent of the invention. FIG. 9 to FIG. 11 show the cigarette which is not wrapped with the paper for wrapping tobacco leaves. The adsorbents of the invention, in addition to the physical adsorbent and the other chemical adsorbents, is placed in a filter in different arrangements, respectively from FIG. 9 to FIG. 11.

Figure 9A:
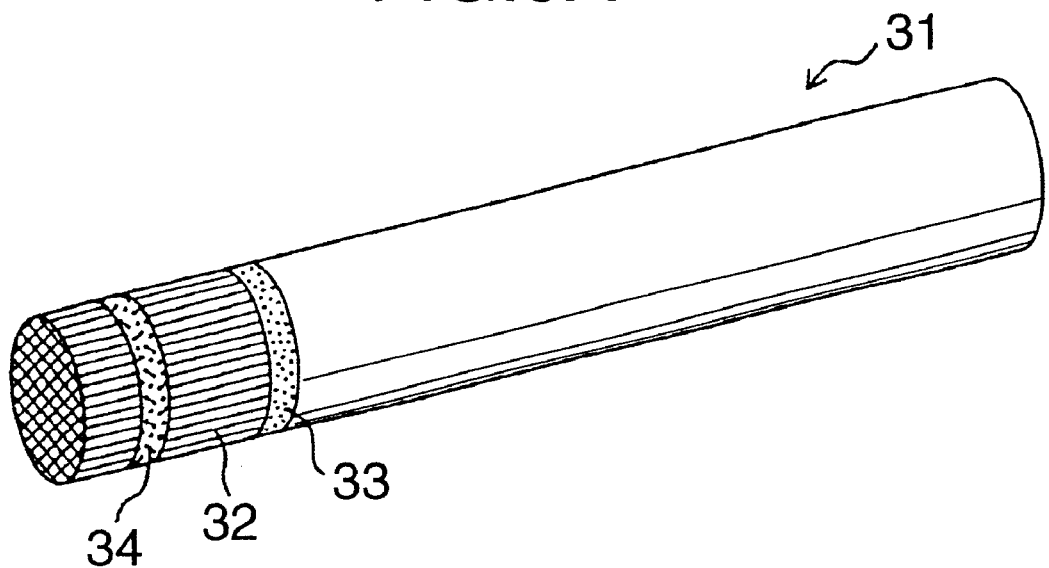
FIG. 9A is a perspective view of the cigarette as an example of the article of the invention.
Figure 9B:
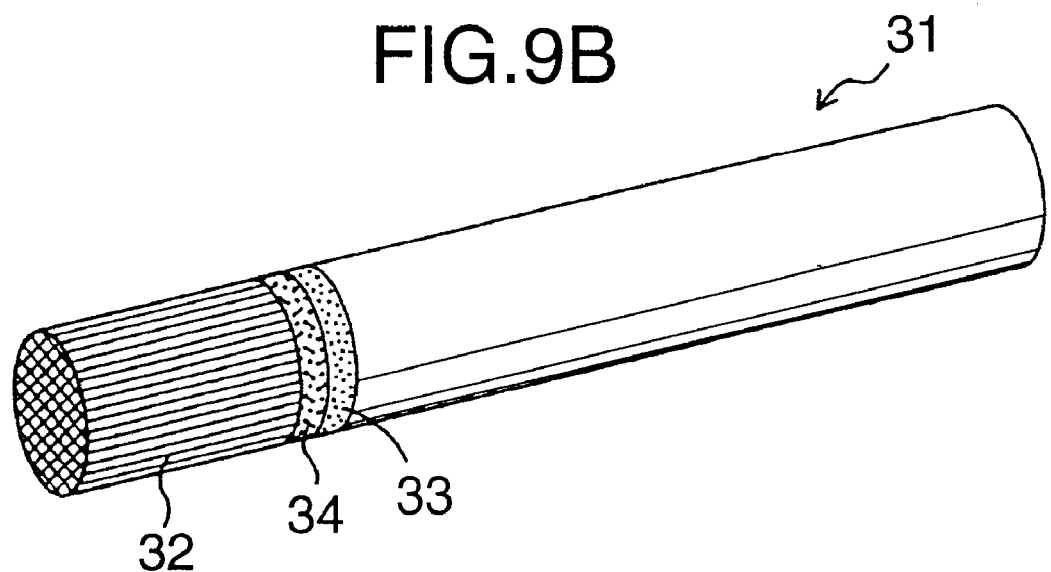
FIG. 9B is a perspective view of a modified example of the cigarette of the article of the invention.
Figure 9C:
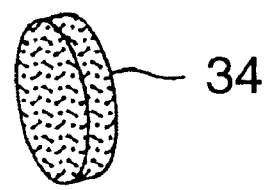
FIG. 9C is a perspective view of the adsorbent which is applied to the cigarette of the invention.

A cigarette 31 shown in FIG. 9A has a filter 32 in the form of sponge. The filter 32 includes a physical adsorbent portion 33 comprising an activated charcoal at the one end of the filter 32 connected to the combustion portion, and a chemical adsorbent portion 34 comprising the chemical adsorbent of the invention in the middle of the filter 32. The chemical adsorbent portion 34 may further comprise the other chemical adsorbents if necessary. In a cigarette 31 shown in FIG. 9B, the filter 32 comprises the physical adsorbent portion 33 connected to the combustion portion and the chemical adsorbent portion 34 next to the portion 33. The chemical adsorbent portion 34 may be formed into the shape of tablet having permeability, or the granules of the chemical adsorbent may be put into a permeable sheet having a discoid shape with the same diameter as that of the cigarette 31, as shown in FIG. 9C. If the chemical adsorbent portion 34 having a shape shown in FIG. 9C is prepared prior to the production of cigarettes, the productivity of a cigarette 31 is never lowered.

Figure 10A:
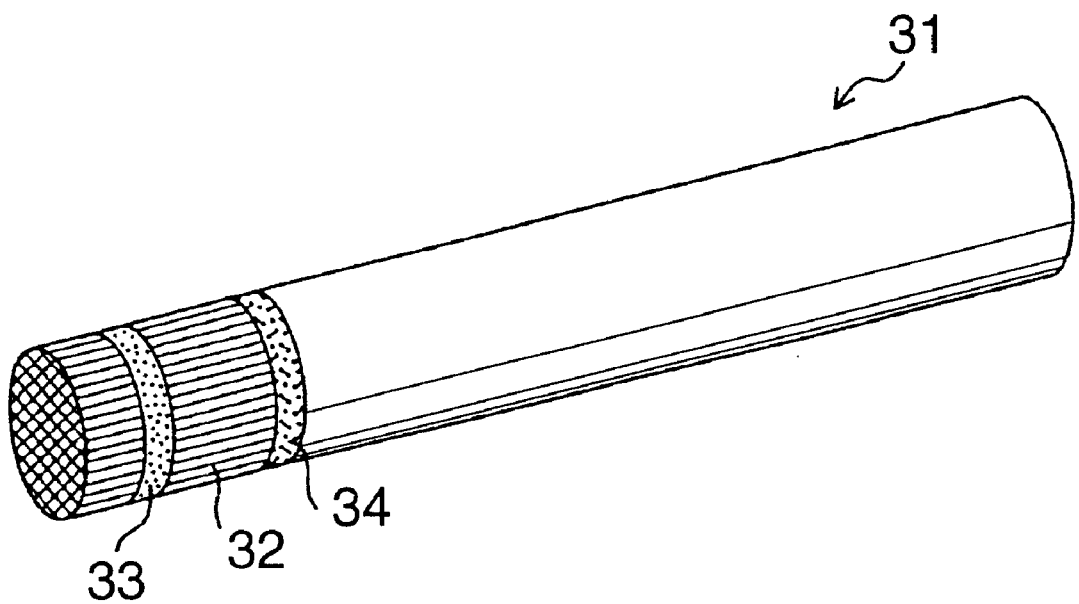
FIGS. 10A and 10B are perspective views of other modified examples of the cigarette of the invention.
Figure 10B:
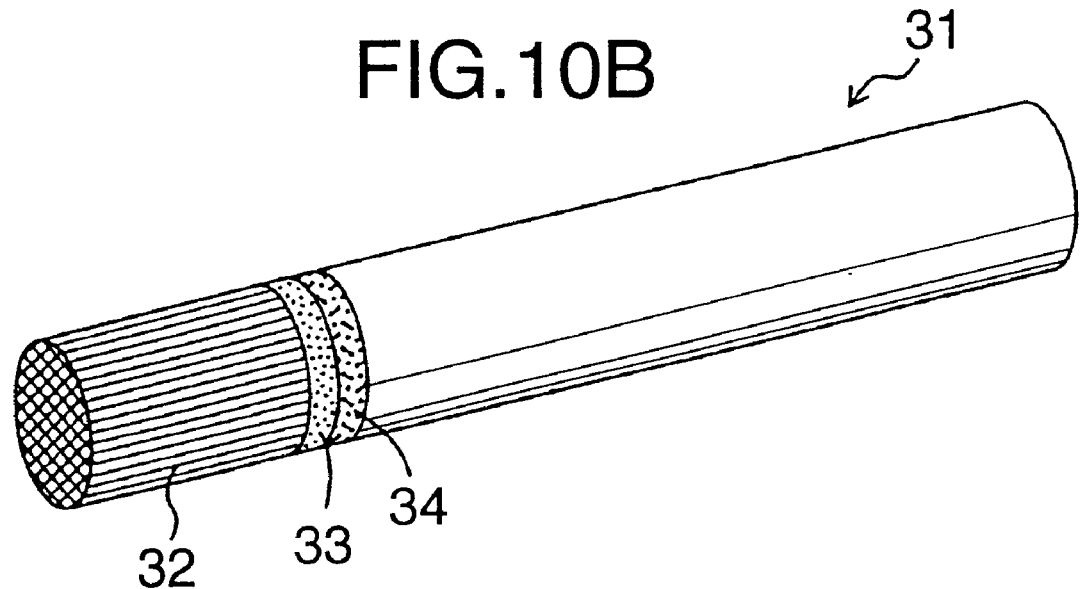

In the cigarette 31 shown in FIG. 10A, contrary to the structure of FIG. 9A, the filter 32 comprises the physical adsorbent portion 33 in the middle of the filter 32, and the chemical adsorbent portion 34 connected to the combustion portion. In the cigarette 31 shown in FIG. 10B, contrary to the structure of FIG. 9B, the filter 32 comprises the chemical adsorbent portion 34 connected to the combustion portion and the physical adsorbent portion 33 next to the chemical adsorbent portion 33.

Figure 11A:
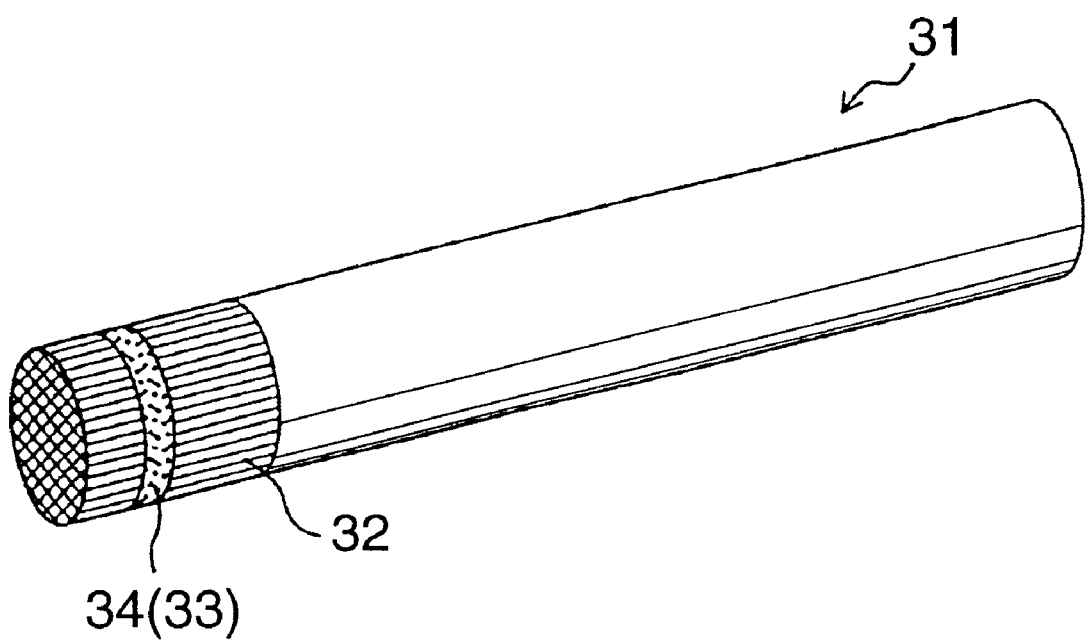
FIGS. 11A and 11B are also perspective views of other modified examples of the cigarette of the invention.
Figure 11B:
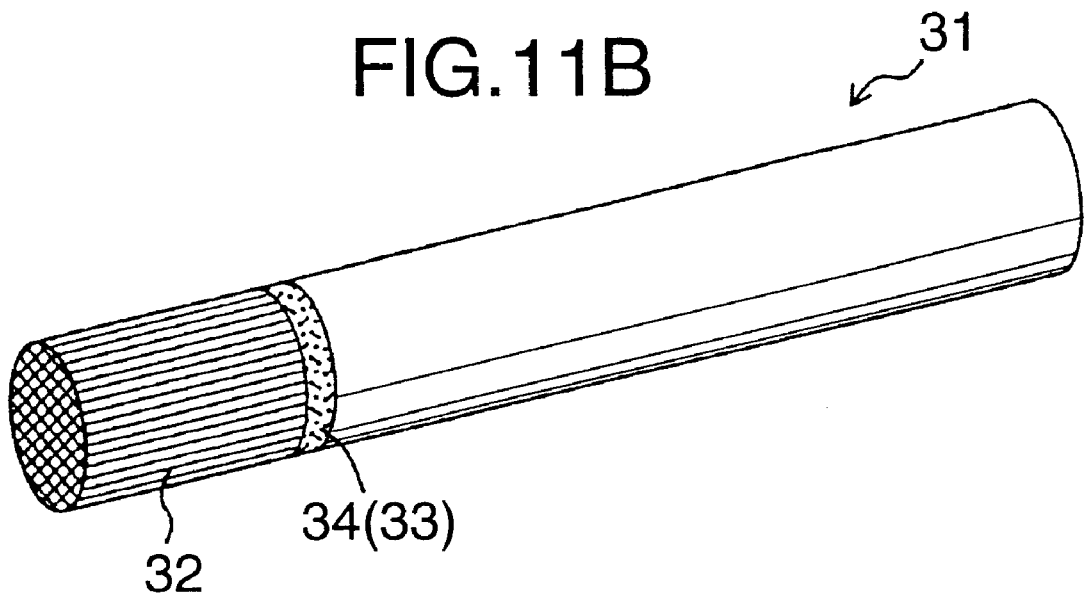

In the cigarette 31 shown in FIG. 11A, the chemical adsorbent and the activated charcoal are contained in the same portion 34(33) which is placed in the middle of the filter 32. In the cigarette 31 shown in FIG. 11B, the chemical adsorbent and the activated charcoal are contained in the same portion 34(33) which is placed at the end of the filter 32 and connected to the combustion portion.

As long as the filter 32 comprises the chemical adsorbent portion 34 which contains the chemical adsorbent of the invention, the cigarette 31 does not cause the odors and corrosions because the aldehyde is removed efficiently while passing through the chemical adsorbent portion 34.

FIG. 9 to FIG. 11 show the various arrangements of the chemical adsorbent portion 34 and the physical adsorbent portion 33. However, in order to adsorb the aldehyde which is once adsorbed by the activated charcoal in the physical adsorbent portion 33 but released therefrom again, preferable is the structure shown in FIG. 9 where the physical adsorbent portion 33 comprising the activated charcoal is placed on the upstream side of the chemical adsorbent portion 34 comprising the adsorbent of the invention, or the structure shown in FIG. 11 where the adsorbent of the invention and the activated charcoal are contained in the same portion 34(33). However, a cigarette generates a large amount of the aldehyde, therefore, the chemical adsorbent portion 34 may be placed on the upstream side, and the physical adsorbent portion 33 may be placed on the downstream side.

(c) Building Material

Figure 12:
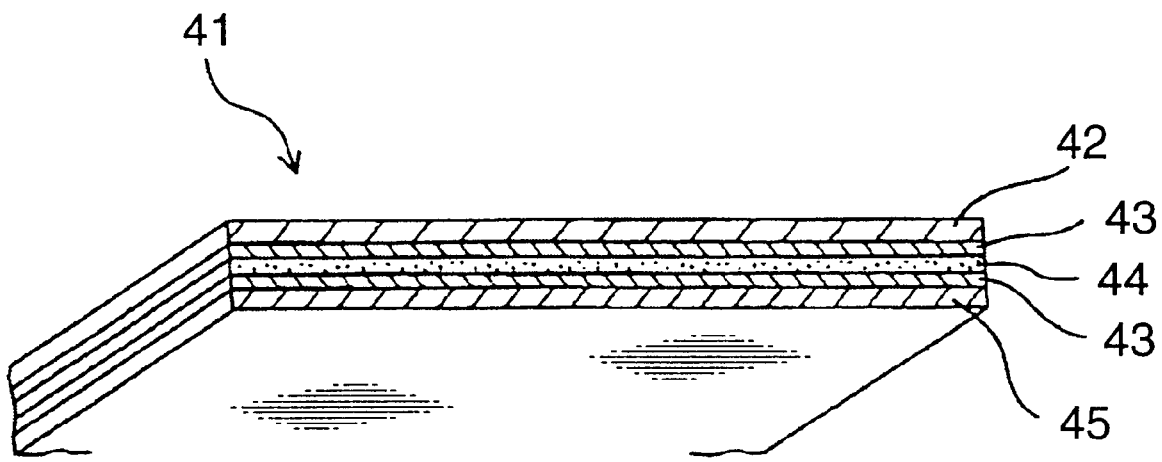
FIG. 12 is a perspective view of the building material as an example of the article of the invention.

A building material 41 equipped with the adsorbent of the invention will be shown in FIG. 12. The building material 41 has a five-layered structure including a base material 42, a glass fiber mat 43, an adsorbent sheet 44, a glass fiber mat 43, and a permeable member 45 arranged in this order from top to bottom as shown in FIG. 12. The building material 41 is used, for example, for a ceiling of a room. The bottom surface of the building material 41 (that is, the permeable member 45) faces the room. The base material 42 includes, for example, a plate prepared by hardening wood chips with an adhesive, and a plywood prepared by laminating thin panels with each other.

The adsorbent sheet 44 contains the adsorbent of the invention in the form of granule which are the same types as those described. Specifically, the adsorbent sheet 44 is prepared by laminating two permeable sheets such as non-woven fabrics to each other, and scattering the adsorbents between the sheets. The adsorbent sheet 44 may contain the other chemical adsorbents and the physical adsorbent in addition to the adsorbent of the invention. The glass fiber mat 43 is used as a reinforcement material. A decorative sheet made of a porous material may be used as the permeable member 45.

By attaching the building material 41 shown in FIG. 12 to the ceiling of a room in a house and a building, the adsorbent sheet 44 adsorbs the aldehyde released from the adhesive used in the base material 42. Therefore, the aldehyde is never allowed to escape from the building material 41 into the room. When a combustion heater is used or someone smokes in the room, the aldehyde generated therefrom, upon contact with the adsorbent sheet 44 through the permeable member 45 and the glass fiber mats 43, is adsorbed by the adsorbent sheet 44. Therefore, it is possible to avoid the increase of the aldehyde concentration in the room.

Figure 13:
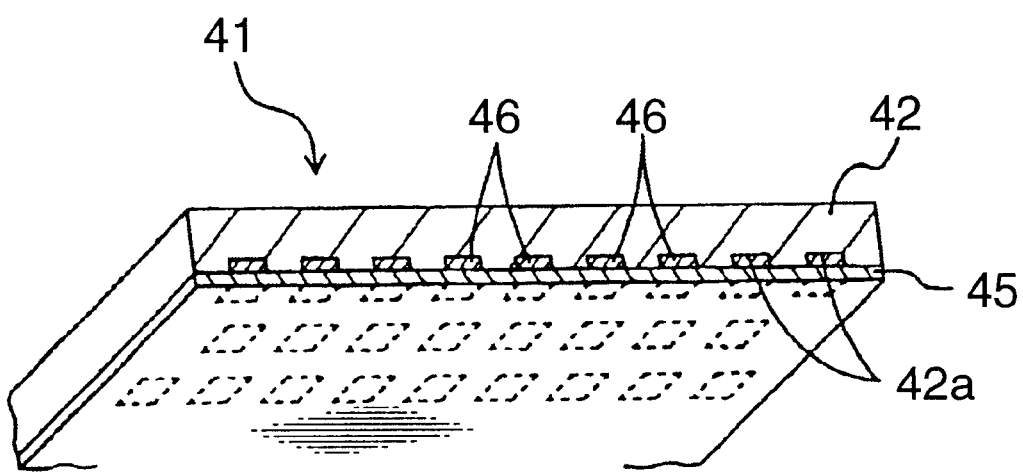
FIG. 13 is a perspective view of a modified example of the building material of the invention.

FIG. 13 shows a modified example of a building material 41 shown in FIG. 12. In the building material 41, a plurality of recesses 42a are formed on one side of the base material 42 (on the bottom surface of the base material 42). In each recess 42a, the adsorbent 46 in the form of granule is charged. In this example, the bottom surface of the base material 42 is covered with the permeable member 45 so that the recesses 42a are closed. The base material 42 includes, for example, a plate prepared by hardening wood chips with an adhesive, or a plywood prepared by laminating thin panels with each other, and the permeable member 45 includes a decorative sheet made of a porous material.

The permeable member 45 may be formed with a plurality of pores (not shown) for permeability. In this case, each pore is required to have a diameter smaller than the granules of the adsorbent 46 to prevent the granules from dropping through the pores. This problem can be overcome by forming the adsorbent 46 into a solid form which is similar to the shape of the recess 42a and stuffing the adsorbent 46 in the solid form into each recess 42a prior to laminating the permeable member 45.

In this example, the aldehyde released from the adhesive contained in the base material 42, and the aldehyde generated from a combustion heater and a cigarette in the room are adsorbed by the adsorbent 46 by the same mechanism as described above. Thus, the use of the building material 41 enables to avoid the increase of the aldehyde concentration in the room.

Figure 14A:
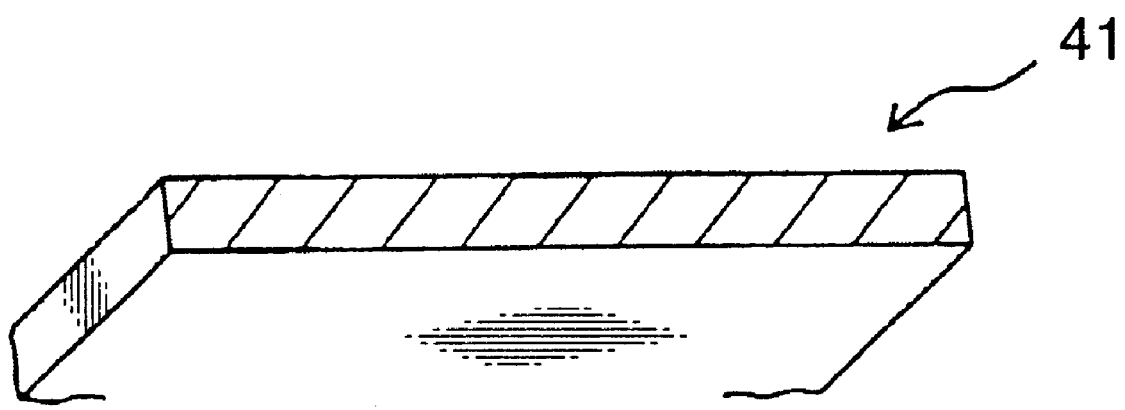
FIG. 14A is a perspective view of another modified example of the building material of the invention.
Figure 14B:
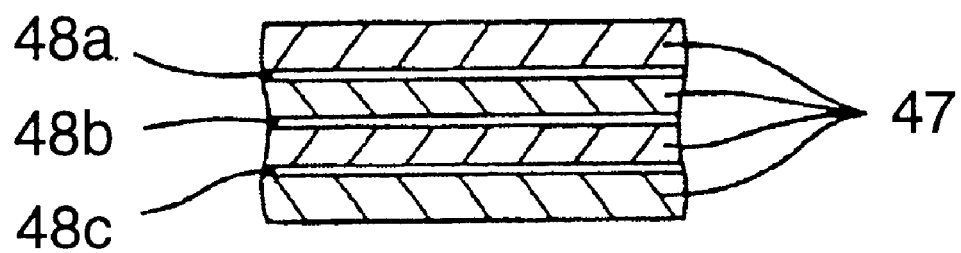
FIG. 14B is a partially enlarged sectional view of FIG. 14A.

FIG. 14A shows another modified example of a building material 41, and FIG. 14B is a partially enlarged view of FIG. 14A. As shown in FIG. 14B, the building material 41 is a plywood constituted by laminating a plurality of thin plates 47 which are bonded each other with the adhesive layers 48a, 48b, and 48c. The adhesive layer 48c at the lowest position contains the adsorbent of the invention.

The adhesive layers tend to generate the aldehyde. Especially, the aldehyde generated from the adhesive layers 48a and 48b passes through the thin plates 47 and reach the adhesive layer 48c. In such a manner, the adsorbent contained in the adhesive layer 48c adsorbs the aldehyde generated from the adhesive layers 48a and 48b located above the adhesive layer 48c as well as the aldehyde generated from the adhesive layer 48c. Thus, it is possible to prevent the aldehyde from escaping from the building material 41 and dispersing into the room.

In this example, only the adhesive layer 48c at the lowest position contains the adsorbent. The adhesive layers 48a and 48b may or may not contain the adsorbent, as far as the adhesive layer 48c contains the adsorbent. If all the adhesive layers 48a to 48c contain the adsorbent, the efficiency of the adsorption is improved, because each adhesive layer 48a to 48c adsorbs the aldehydes generated from their own adhesives. It is also possible to contain the adsorbent in the adhesive layers of the building material 41 shown in FIG. 12. In this case, instead of the adsorbent sheet 44, the adsorbent is contained only in the lowest adhesive layer between the glass fiber mat 43 and the permeable member 45, or in each adhesive layer among the base substrate 42, the glass fiber mat 43 and the permeable member 45. In addition, the base material 42 can also contain the adsorbent.

(d) Other Articles

Figure 15:
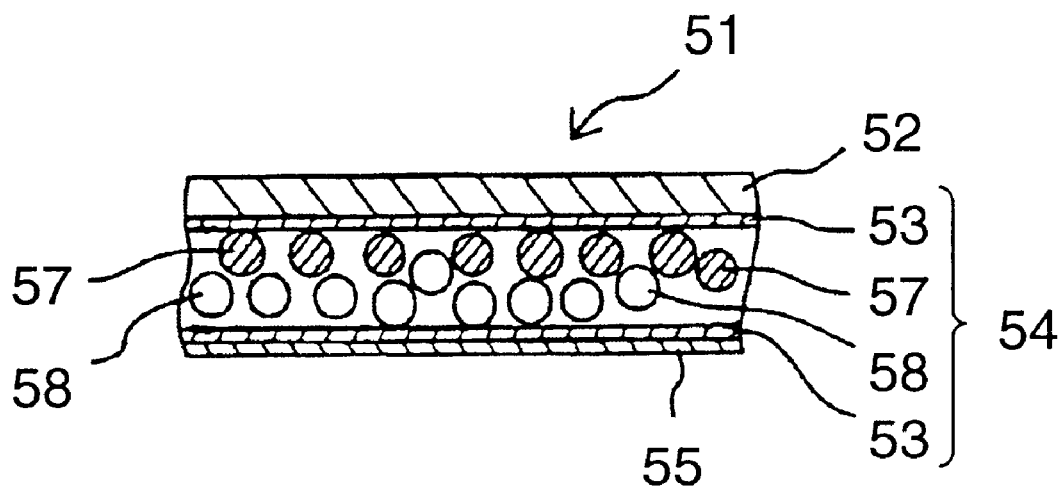
FIG. 15 is a sectional view of the article of the invention.
Figure 16:
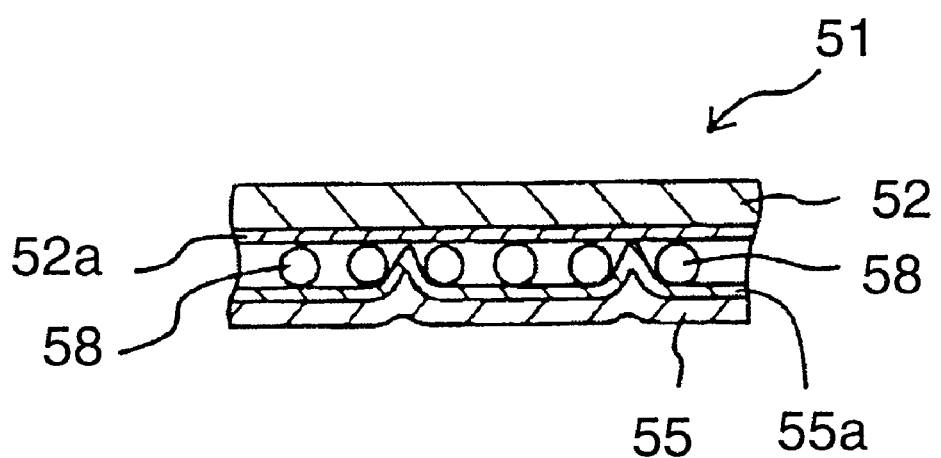
FIG. 16 is a sectional view of a modified example of the article of the invention.

FIG. 15 and FIG. 16 show examples of the articles with the adsorbent of the invention other than those described above. Examples of the articles are wear, baggage, furnishings, and housewares. The applications of the adsorbent are not limited to these articles, but the adsorbent of the invention can be used for other various articles.

An article 51 shown in FIG. 15 comprises a base substrate 52, an adsorbing sheet 54 dispersing many adsorbents in the form of granule between two fiber mats 53, and a permeable surfacing member 55 laminated to the lower surface of the lower fiber mat 53. The fiber mat 53 includes, for example, a weaving and a non-woven fabric.

The physical adsorbent 57 and the chemical adsorbent 58 comprising the adsorbent of the invention are used as the adsorbent in the adsorbing sheet 54. The layer of the physical adsorbent 57 and the layer of the chemical adsorbent 58 are arranged to be close to each other, and the layer of the physical adsorbent 57 is arranged on the side of the base substrate 52. The adsorbents 57 and 58 are interposed between the two fiber mats 53 which constitute the upper and lower surfaces of the adsorbing sheet 54. The arrangement of the physical adsorbent 57 and the chemical adsorbent 58 is not limited to the above arrangement, but other arrangements may be employed. For example, the chemical adsorbent 58 may be arranged on the side of the base substrate 52, or the physical adsorbent 57 and the chemical adsorbent 58 may be mixed between the two fiber mats 53. A hot melt adhesive (not shown) is applied over the inside surface of the respective fiber mats 53 to adhere both adsorbent 57 and 58 with the fiber mats 53 by pressurizing the fiber mats 53 interposing the absorbents 57 and 58 at high temperature.

Thus, as long as the article includes the adsorbing sheet 54 as described above, the article adsorbs the aldehyde effectively in the place where it is used. For example, when the adsorbent is applied to wear such as clothing, the clothing adsorbs the aldehyde around a person wearing the clothing. Taking this advantage into consideration, working wear are the preferable example of the article with the adsorbent of the invention.

In FIG. 16, only the chemical adsorbent 58 is used and no physical adsorbent is used. The chemical adsorbent 58 is interposed between a base material 52 and a permeable surfacing member 55, and no fiber mats are used. Specifically, on the base material 52, a hot melt adhesive 52a is applied, and then the chemical adsorbent 58 is provided thereon. On the other hand, a hot melt adhesive 55a is also applied on one side of the permeable surfacing member 55. The permeable surfacing member 55 is placed on the base material 52 in such a manner that their sides coated with the hot melt adhesive are brought into contact with each other, and they are pressurized at high temperature to be attached each other. In this manner, the chemical adsorbent 58 is interposed between the base material 52 and the permeable surfacing member 55, and at the same time, the base material 52 and the permeable surfacing member 55 are adhered each other at specific positions of their peripheral areas and intermediate areas.

Alternatively, the adhesive 55a may be applied to the chemical adsorbent 58 scattered on the permeable surfacing member 55 to adhere them. The permeable surfacing member 55 with the chemical adsorbent 58 is laminated to the base material 52 with the adhesive layer 52a and pressurized at a high temperature so that the chemical adsorbent 58 is interposed between the base material 52 and the permeable surfacing member 55. In the above methods, the adhesive is applied to both the base material 52 and the permeable surfacing member 55. However, the adhesive can be applied to either of the base material 52 and the permeable surfacing member 55. In addition, only the chemical adsorbent 58 is used as the adsorbent in the above methods, however, the physical adsorbent 57 as an activated charcoal may also be used, as is the case shown in FIG. 15.

In both of FIG. 15 and FIG. 16, the adsorbent is covered with the permeable surfacing member 55. However, the permeable surfacing member 55 may not be used when the adsorbent is placed inside the article 51 (for example, when the adsorbent is placed at the place where the adsorbent is not seen from the outside, or the untouchable place of the article 51). The use of the adsorbent of the invention in combination of the physical adsorbent and the individual use of the chemical adsorbent are explained in accordance with the examples of the article of the invention in both FIG. 15 and FIG. 16, whichever may be selected depending on the component to be adsorbed. In addition, the adsorbent may be placed at anywhere as it is required in the article 51, and not limited to being placed at the arrangement of the foregoing drawings. For example, the adsorbent contained in a vessel may be used as the article 51.

The present invention is constituted as mentioned above. The present inventors have succeeded in developing the adsorbent which can adsorb and remove aldehydes to be adsorbed for a long period. Taking advantage of this adsorbent, the present invention further provide an adsorption device and an article which can remove aldehydes briefly in a small scale, and a method using the adsorbent.

The adsorbent of the invention exhibits the excellent and constant adsorbing performance even if the adsorbent is used for a compact device, thus the adsorbent of the invention can be applied to adsorb the aldehydes, especially existing in an automobile, a house, or a residence efficiently.

EXAMPLES

The following examples illustrate the present invention, however these examples are intended to illustrate the invention and are not to be construed to limit the scope of the invention. Many variations and modifications of such examples will exist without departing from the scope of the inventions. Such variations and modifications are intended to be within the scope of the invention.

Example 1

Figure 17:
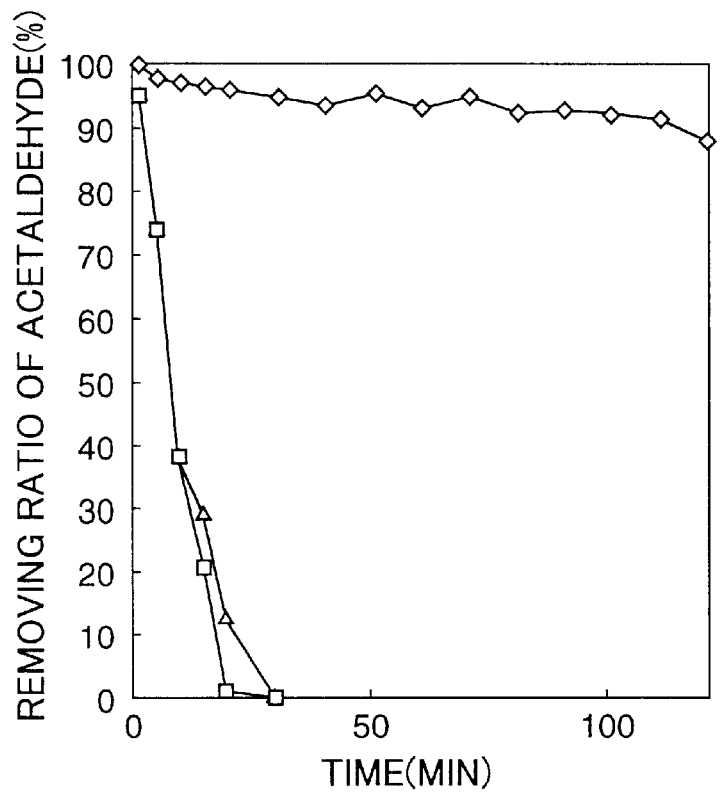
FIG. 17 is a graph showing the persistency of various kinds of the adsorbent when it is subjected to removing the acetaldehyde.

An activated charcoal, H zeolite with the crystal structure of ZSM-5 (hereinafter referred as H zeolite ZSM-5), and $NH_4$ zeolite with the crystal structure of ZSM-5 (hereinafter referred as $NH_4$ zeolite ZSM-5) are used for preparing the adsorbent. $NH_4$ zeolite ZSM-5 was prepared by the process where the quarternary ammonium salt was not removed completely and left in the zeolite. The activated charcoal, H zeolite ZSM-5 and $NH_4$ zeolite ZSM-5 in a powder form were added to a polyvinyl alcohol aqueous solution to obtain four kinds of the adsorbent in a granule form. 0.2 g of the obtained adsorbents were charged into narrow glass tubes, respectively to obtain absorbing members. The adsorbing members were used to determine the removing ability of acetaldehyde by allowing a gas containing acetaldehyde to pass through the adsorbing member one time and measuring the concentration of acetaldehyde at the downstream of the adsorbing member with time. A gas which contains 10 ppm of acetaldehyde was allowed to flow into the adsorbing members at the flow rate of 0.6 m/s. The result was shown in FIG. 17. It was apparent that the adsorbent of the invention which uses $NH_4$ zeolite exhibited the more excellent adsorbing performance (removing ratio of acetaldehyde) for a longer period than the adsorbents using the conventional activated charcoal and H zeolite.

Example 2

As shown in Table 1, $NH_4$ zeolite with various crystal structures and molar ratios of $SiO_2/Al_2O_3$, Na zeolite and a natural zeolite, which did not retain the quarternary ammonium salt, were added to a polyvinyl alcohol aqueous solution to obtain the adsorbent in a granule form. However, the quarternary ammonium salt which is used as a mineralizer at the synthesis of the zeolite is contained in the zeolite ZSM-5 which has a molar ratio of $SiO_2/Al_2O_3$ of 70. 0.2 g of the adsorbent was charged into narrow glass tubes, respectively to obtain adsorbing members. A gas which contains 35 ppm of formaldehyde and 10 ppm of acetaldehyde was allowed to flow into the adsorbing member at the flow rate of 1 litter/min. to determine the removing ratio of formaldehyde after an elapse of 30 mins. The saturated adsorption amount of acetaldehyde was also determined. The saturated adsorption amount of acetaldehyde was shown in Table 1 in terms of the zeolite before retaining the quarternary ammonium salt.

Further, the effect of retaining the quarternary ammonium salt in the zeolite on the adsorption of acetaldehyde was studied. Tetra-n-propylammonium bromide was used as the quarternary ammonium salt compound. The above zeolite without the quarternary ammonium salt was immersed in tetra-n-propylammonium bromide aqueous solution to obtain a zeolite retaining tetra-n-propylammonium bromide. The adsorbing member were prepared in the same way as described above. The saturated amount of the acetaldehyde was measured in terms of the zeolite after retaining the quarternary ammonium salt, in the same way as the zeolite before retaining the quarternary ammonium salt. The effect of retaining the quarternary ammonium salt was defined as the improving ratio shown by the following equation.

Improving ratio=the adsorption amount(mg) of the acetaldehyde after retaining the quarternary ammonium salt/the adsorption amount(mg) of the acetaldehyde before retaining the quarternary ammonium salt.

Using the zeolite after retaining the quarternary ammonium salt, the amount of carbon (carbon adsorption) was also determined. This value means a degree of the amount of the quarternary ammonium salt retained in the zeolite as described later. The result of removing ratio of formaldehyde, the saturated adsorption amount of acetaldehyde(acetaldehyde adsorption), the evaluation of the saturated adsorption amount, improving ratio, and carbon adsorption compared with an activated charcoal were shown in Table 1.

TABLE 1

| Zeolite type | | | | Removing ratio of | | Acetaldehyde adsorption | | | | improving | Carbon |
| --- | --- | --- | --- | --- | --- | --- | --- | --- | --- | --- | --- |
| ion type | structure | pore size | $SiO_2/Al_2O_3$ | formaldehyde | | no QAS[*1)] | | with QAS[*1)] | | ratio | adsorption |
| — | — | (Å) | (mole ratio) | (%) | evaluation | (mg) | evaluation | (mg) | evaluation | — | (mass %) |
| $NH_4^+$ | ZSM-5 | 5.5 | 30 | 71 | excellent | 0.07 | fair | 0.66 | excellent | 9.4 | 0.6 |
| $NH_4^+$ | ZSM-5 | 5.5 | 55 | 82 | excellent | 0.45 | excellent | 5.0 | excellent | 11.1 | 4.0 |
| $NH_4^+$ | ZSM-5 | 5.5 | 70 | 73 | excellent | — | — | 5.0 | excellent | — | 3.0 |
| $NH_4^+$ | ZSM-5 | 5.5 | 190 | 73 | excellent | 0.45 | excellent | 3.5 | excellent | 7.8 | 2.3 |
| $NH_4^+$ | Y | 7.4(110),2.2(110) | 25 | 71 | excellent | 0.05 | fair | 0.06 | fair | 1.2 | 0.1 |
| $NH_4^+$ | Y[*2)] | 7.4(110),2.2(110) | 60 | 80 | excellent | 0.05 | fair | 0.06 | fair | 1.2 | 0.1 |
| $NH_4^+$ | Y | 7.4(110),2.2(110) | 80 | 86 | excellent | 0.07 | fair | 0.05 | fair | 0.7 | 0.05 |
| $NH_4^+$ | Y | 7.4(110),2.2(110) | 120 | 50 | good | 0.16 | fair | 0.07 | fair | 0.4 | 0.05 |
| $NH_4^+$ | β | >6 | 50 | 87 | excellent | 0.3 | good | 0.1 | fair | 0.3 | 0.05 |
| $NH_4^+$ | mordenite | 6.7,2.9 | 90 | 79 | excellent | 0.07 | fair | 0.07 | fair | 1.0 | 0.1 |
| $NH_4^+$ | ferrierite | 4.3,3.4 | 55 | 47 | good | 0.3 | good | 0.45 | excellent | 1.5 | 0.3 |
| Na | Y | 7.4(110),2.2(110) | — | 0 | poor | 0.04 | fair | 0.13 | fair | 3.3 | 0.3 |
| Na | mordenite | 6.7,2.9 | — | 0 | poor | 0.07 | fair | 0.01 | fair | 0.1 | 0.05 |
| Na | A | 4.2,2.2 | — | 0 | poor | 0 | poor | 0.05 | fair | — | 0.1 |
| Na | X | 7.4,2.2 | — | 0 | poor | 0.04 | fair | 0.1 | fair | 2.5 | 0.1 |
| natural | mordenite | Izuka-zeolite | 5 | 0 | poor | 0.01 | fair | 0.02 | fair | 2.0 | — |
| natural | mordenite | Iwami-zeolite | 12 | 0 | poor | 0.04 | fair | 0.01 | fair | 0.3 | — |
| natural | clinoptilolite | MGIwami-zeolite | 13 | 0 | poor | 0.01 | fair | 0 | poor | — | — |
| activated charcoal | | | — | 35 | | 0.2 | | | | — | — |

[*1)]QAS:quarternary ammonium salt
[*2)]The supplier of zeolite Y* is different from the supplier of other zeolite Y.

As shown in Table 1, $NH_4$ zeolite exhibited an excellent removing ability of formaldehyde, in particular, the $NH_4$ zeolite with the crystal structure of ZSM-5, Y, β and mordenite exhibited more excellent removing ability of formaldehyde. It was also confirmed that the excellent removing ability of formaldehyde was also obtained by the zeolite ZSM-5 which has a molar ratio of $SiO_2/Al_2O_3$ from 30 to 190. On the other hand, Na zeolite and a natural zeolite did not adsorb formaldehyde.

Each of the zeolite before retaining the quarternary ammonium salt adsorbed acetaldehyde in a small amount. However, the zeolite with the crystal structure of ZSM-5 and ferrierite after retaining the quarternary ammonium salt adsorbed acetaldehyde in an increased amount and exhibited a superior removing ability to the activated charcoal and the other zeolite. Among them, the absorption amount of acetaldehyde of the zeolite ZSM-5 after retaining the quarternary ammonium salt was 7.8 to 11.1 times as much as that of the zeolite before retaining the quarternary ammonium salt.

It appears that this result related to the carbon adsorption amount of the zeolite. Since the carbon adsorption amount of the zeolite is only derived from the quarternary ammonium salt which is retained in the zeolite, the higher carbon adsorption amount means a higher amount of the quarternary ammonium salt which is retained in the zeolite. The carbon adsorption amount of the zeolite ZSM-5 was 0.6 to 4.0 mass %, in particular, 2.3 to 4.0 mass % when the ZSM-5 zeolite has a molar ratio of $SiO_2/Al_2O_3$ from 55 to 190, and the carbon adsorption amount of the ferrierite zeolite was 0.3 mass %. Therefore, the zeolite ZSM-5 retained the quarternary ammonium salt in a highest amount and the ferrierite zeolite retained the quarternary ammonium salt in a higher amount, respectively, than other zeolites, thereby exhibiting the excellent adsorption performance with the enhanced reaction of the quarternary ammonium salt with acetaldehyde.

The removing ability of formaldehyde after an elapse of 30 min. was also determined in the same manner as described above in terms of the $NH_4$ zeolite ZSM-5 which retained tetra-n-propylammonium bromide as the quarternary ammonium salt. The removing ability of formaldehyde was 62%, 70% and 67% in terms of the $NH_4$ zeolite ZSM-5 having a molar ratio of $SiO_2/Al_2O_3$ of 30, 55 and 190, respectively.

Example 3

Figure 18:
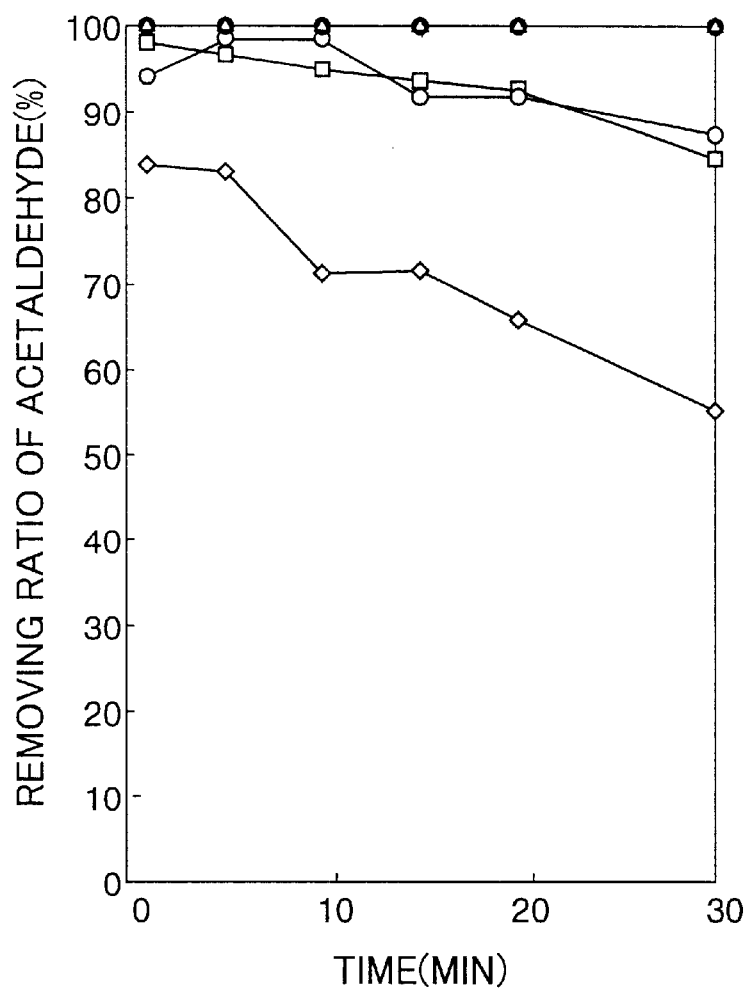
FIG. 18 is a graph showing the persistency of the adsorbent when various kinds of tetraalkylammonium salt is used.

The effect of the kinds of the quarternary ammonium salts on the adsorption performance was studied. The $NH_4$ zeolite ZSM-5 with the molar ratio of $SiO_2/Al_2O_3$ of 55 is used as a zeolite. A polyvinyl alcohol as a binder was mixed with the $NH_4$ zeolite in an amount of 2.5 mass % with respect to the zeolite. Tetramethylammonium bromide, tetraethylammonium bromide, tetra-n-propylammonium bromide and tetra-n-butylammonium bromide were used as the quarternary ammonium salt. The quarternary ammonium salts were retained in the $NH_4$ zeolite ZSM-5 in the same way of Example 2. The removing ability of acetaldehyde with time was measured in the same manner as Example 1 in terms of the above zeolites. The result was shown in FIG. 18.

The removing ability of acetaldehyde of the zeolites after retaining the quarternary ammonium salt did not decrease with time as much as that of the zeolite without retaining the quarternary ammonium salt. Especially, the zeolites after retaining the tetraethylammonium bromide and the tetra-n-propylammonium bromide exhibited 100% of the removing ability of acetaldehyde after an elapse of 30 mins.

Example 4

Figure 19:
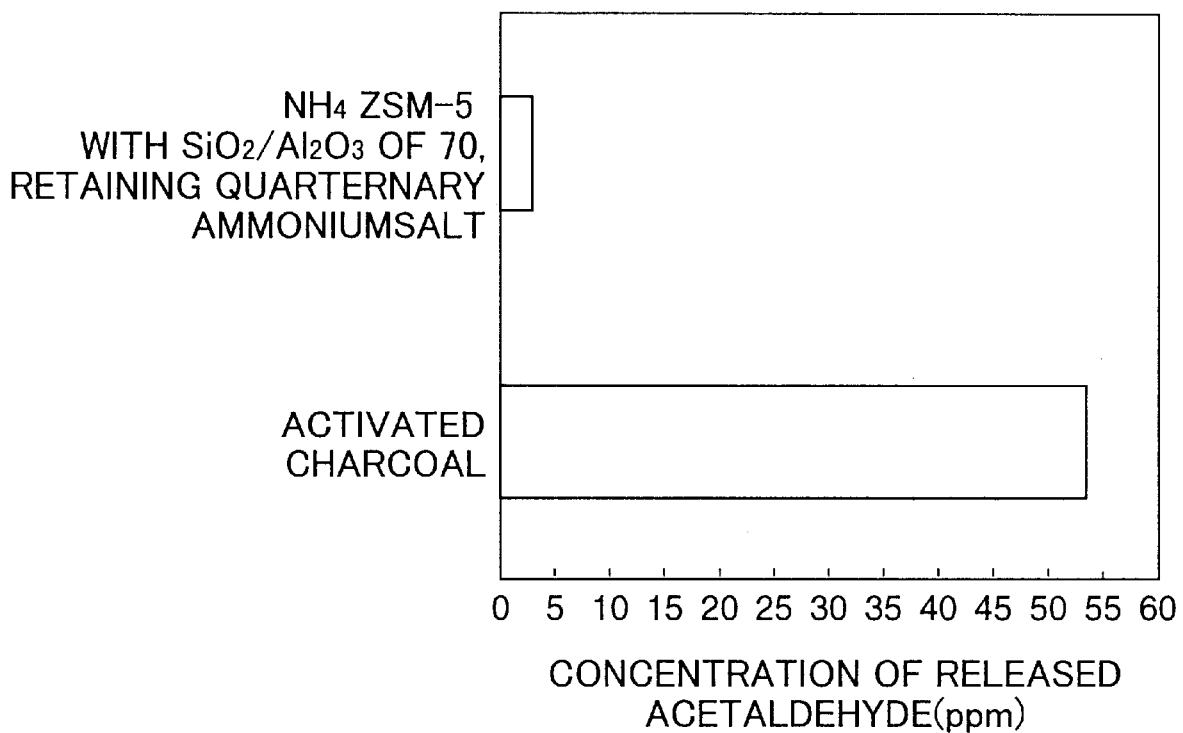
FIG. 19 is a graph showing the comparison of the adsorbent of the invention with an activated charcoal in terms of releasing the acetaldehyde.

The adsorbent of the invention was compared with the activated charcoal in terms of the acetaldehyde-releasing test. The $NH_4$ zeolite ZSM-5 with a molar ratio of $SiO_2/Al_2O_3$ of 70 which retains the quarternary ammonium salt and the activated charcoal were used in an amount of 0.2 g, respectively for the adsorbing member. A gas containing 10 ppm of acetaldehyde was allowed to flow into the adsorbing member at the flow rate of 0.6 m/sec. for 30 mins so that the acetaldehyde was once adsorbed by the adsorbing member. The adsorbing member was sealed in 20 ml of a vessel and heated at 80° C. for 10 mins. to determine the amount of the acetaldehyde released from the adsorbing member. The result was shown in FIG. 19. It was confirmed that the adsorbent of the invention released less than 5 ppm of acetaldehyde while the activated charcoal released approximately 50 ppm of acetaldehyde.

This application is based on Japanese Patent application No. 2000-22781 and No. 2000-246769 dated Jan. 31, 2000 and Aug. 16, 2000, respectively, the contents of which are hereby incorporated by reference.

What is claimed is:

1. An adsorbent comprising a zeolite, wherein a component to be adsorbed is aldehyde;

the zeolite has $NH_4^+$ as ionic species;

the zeolite has a crystal structure of ZSM-5 or ferrierite;

the zeolite has a molar ratio of $SiO_2/Al_2O_3$ from 30 to 190; and the zeolite retains a quarternary ammonium salt which adsorbs the aldehyde with the reaction of the aldehyde.

2. The adsorbent according to claim 1, wherein the component to be adsorbed is acetaldehyde.

3. The adsorbent according to claim 1, wherein the zeolite has the crystal structure of ZSM-5.

4. The adsorbent according to claim 1, wherein the quarternary ammonium salt is tetraethylammonium salt or tetra-n-propylammonium salt.

5. An adsorbent comprising a zeolite, wherein a component to be adsorbed is acetaldehyde;

the zeolite has $NH_4^+$ as ionic species;

the zeolite has a crystal structure of ZSM-5;

the zeolite has a molar ratio of $SiO_2/Al_2O_3$ from 55 to 190; and the zeolite retains a quarternary ammonium salt which adsorbs the acetaldehyde with the reaction of the acetaldehyde.

6. The adsorbent according to claim 5, wherein the quarternary ammonium salt is tetraethylammonium salt or tetra-n-propylammonium salt.

7. An adsorbent comprising a zeolite, wherein a component to be adsorbed is formaldehyde;

the zeolite has $NH_4^+$ as ionic species the zeolite has a crystal structure of ZSM-5; and the zeolite has a molar ratio of $SiO_2/Al_2O_3$ from 30 to 190.

* * * * *